(12) United States Patent
Cordeiro et al.

(10) Patent No.: US 8,175,046 B2
(45) Date of Patent: May 8, 2012

(54) NOTIFICATION OF INCUMBENT USERS IN DYNAMIC SPECTRUM ACCESS WIRELESS SYSTEMS

(75) Inventors: Carlos Cordeiro, Ossining, NY (US); Kiran Challapali, New City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1040 days.

(21) Appl. No.: 12/066,853

(22) PCT Filed: Sep. 14, 2006

(86) PCT No.: PCT/IB2006/053295
§ 371 (c)(1),
(2), (4) Date: Mar. 14, 2008

(87) PCT Pub. No.: WO2007/031959
PCT Pub. Date: Mar. 22, 2007

(65) Prior Publication Data
US 2008/0253347 A1 Oct. 16, 2008

Related U.S. Application Data

(60) Provisional application No. 60/718,127, filed on Sep. 16, 2005, provisional application No. 60/733,504, filed on Nov. 4, 2005.

(51) Int. Cl.
*H04W 4/00* (2009.01)
*H04J 3/16* (2006.01)
(52) U.S. Cl. ........................ 370/329; 370/341

(58) Field of Classification Search ................ None
See application file for complete search history.

(56) References Cited

U.S. PATENT DOCUMENTS

| | | | |
|---|---|---|---|
| 2002/0188723 A1* | 12/2002 | Choi et al. | 709/225 |
| 2003/0171116 A1* | 9/2003 | Soomro | 455/434 |
| 2004/0047324 A1 | 3/2004 | Diener | |
| 2004/0248568 A1 | 12/2004 | Lucidarme | |
| 2006/0009246 A1* | 1/2006 | Marinier et al. | 455/502 |
| 2006/0018284 A1* | 1/2006 | Rudolf et al. | 370/332 |
| 2007/0281724 A1* | 12/2007 | Isobe et al. | 455/518 |
| 2007/0286143 A1* | 12/2007 | Olson et al. | 370/338 |

FOREIGN PATENT DOCUMENTS

| EP | 1473956 A2 | 11/2004 |
|---|---|---|
| WO | WO03001742 A1 | 1/2003 |

OTHER PUBLICATIONS

D. Cabric et al., "Implementation Issues in Spectrum Sensing for Cognitive Radios", Signals, Systems and Computers, 2004, Conference record of the Thirty-Eighth Asilomar Conference on Pacific Grove, CA, USA< Nov. 7-10, 2004, IEEE, Nov. 2004, pp. 772-776, XP010781056.
Internet Citation, "Functional Requirements for the 802.22 WRAN Standard", Aug. 2005, XP002425031 URL:www.ieee802.org/22/Meeting_documents/2005_Aug_teleconferences/22-05-007-39-0000_RAN_Requirements.doc.

* cited by examiner

*Primary Examiner* — Chi Pham
*Assistant Examiner* — Soon-Dong Hyun
(74) *Attorney, Agent, or Firm* — Larry Liberchuk

(57) ABSTRACT

A wireless system and method including a medium access control (MAC) layer adapted to notify a wireless station of the presence or absence of an incumbent wireless are described.

17 Claims, 3 Drawing Sheets

NOTIFICATION OF INCUMBENT USERS IN DYNAMIC SPECTRUM ACCESS WIRELESS SYSTEMS

CROSS-REFERENCE TO RELATED APPLICATIONS

The present application is related to concurrently filed and commonly assigned U.S. patent applications having Ser. Nos. 60/733,520, 60/733,519 and 60/733,503. This application claims the benefit of U.S. provisional application Ser. No. 60/718,127 filed Sep. 16, 2005, which is incorporated herein in whole by reference.

Wireless communication technology has significantly advanced making the wireless medium a viable alternative to wired solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few).

As wireless applications continue to grow, so do the numbers of devices, networks and systems vying for the communications spectrum. As is known, there are dedicated or licensed portions as well as unlicensed portions of the communications spectrum. Because the unlicensed bands of the spectrum (e.g., the industrial, scientific and medical (ISM) radio bands) may be accessed freely, these bands tend to be heavily populated by users. Contrastingly, recent studies indicate that only a small portion of the licensed band is being used. Thus, much of the unlicensed band is overcrowded, while a relatively large portion of the licensed band remains unused. This had lead regulatory bodies (e.g., the Federal Communications Commission (FCC) of the U.S.) to an evaluation of current communication band allocations and their use.

One option for reallocation of the communications band involves the use of wireless networks adapted to dynamically access the communications spectrum. For example, dynamic spectrum access (DSA) wireless networks may be implemented in dedicated (licensed) portions of the communications spectrum. Illustratively, DSA wireless networks may operate in a spectrum normally dedicated for television transmission and reception. Thereby, certain portions of the communications band may be more fully utilized.

With the reallocation of certain communication bands for use by unlicensed (secondary) users, channel management is needed to ensure that licensed (primary or incumbent) users with priority access to the band are provided this access in an unfettered manner. For example, regulatory bodies (e.g., the FCC) may require that a secondary user vacate a channel in a relatively short period of time after an incumbent user begins occupation of the channel. Therefore, the medium access control (MAC) layer and physical (PHY) layer specifications must include provisions directed to this needed channel management.

As can be appreciated, in order for a secondary device to vacate a channel when an incumbent device begins occupying the channel, the secondary devices must be provided notice of the need to vacate the channel. In DSA wireless networks, there may be a large number of secondary devices, rendering the efficient notification of the existence of incumbent devices a difficult task.

What is needed, therefore, is a method of notifying secondary devices of channel occupation by incumbent devices that overcomes at least the shortcomings noted above.

In accordance with an example embodiment, a method of wireless communication includes transmitting a medium access control (MAC) header from a secondary wireless device to another secondary wireless device wherein the MAC header includes a field that indicates the operation or absence of an incumbent device in a primary frequency channel. In accordance with another example embodiment, a data communication includes a medium access control (MAC) frame having an urgent coexistent situation (UCS) field, which indicates operation of an incumbent device.

In accordance with another example embodiment, in a wireless communication network, a method of wireless communication includes allocating upstream (US) bandwidth to a first secondary wireless device; not allocating upstream bandwidth to a second secondary wireless device; transmitting from the first secondary wireless device to a base station a report including measurement information of a restricted frequency channel; and transmitting from the second secondary wireless device to the base station a medium access control (MAC) header including a field that indicates the operation of an incumbent device in the restricted frequency channel or another restricted frequency channel.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
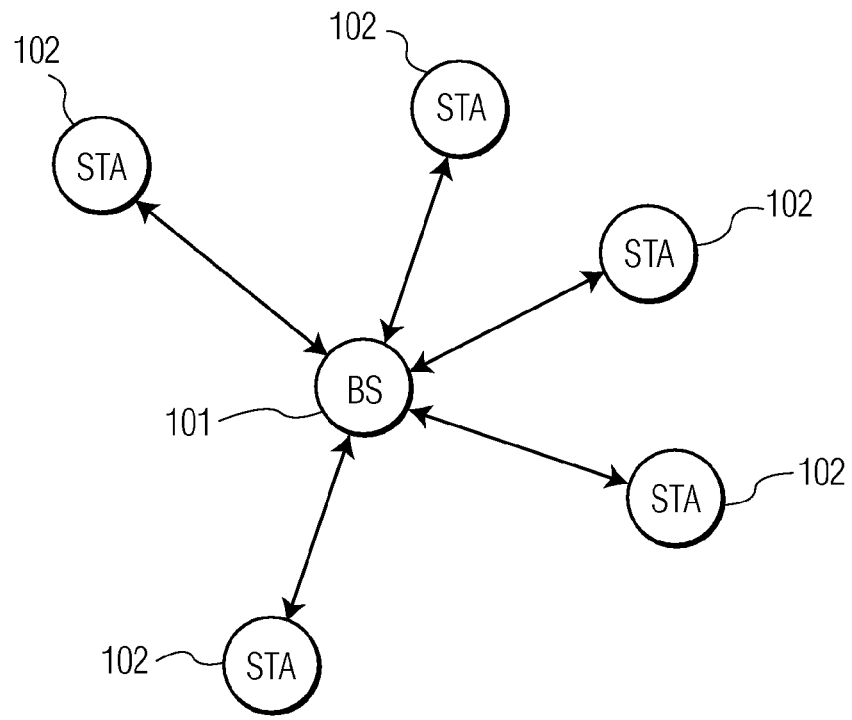
FIG. 1 is a simplified schematic diagram of a wireless communication system in accordance with an example embodiment.

As used herein the term 'restricted frequency channel' or 'restricted channel' means a frequency channel dedicated for use by primary users. The restricted channels may be portions of the communications spectrum that is licensed by a regulatory body such as the FCC, or that are accessed on a priority basis by certain users. For example, the television channels in the United States are licensed frequency channels. However, certain device such as wireless microphones may access the network with priority over other users, even though the wireless microphones are not expressly licensed for use of the television spectrum. Thus, certain unlicensed channels that are restricted channels are contemplated as restricted channels. In addition, so-called licensed-exempt channels, which provide priority access to certain users, are also restricted channels.

As used herein, the terms 'a' and 'an' mean one or more; and the term 'plurality' means two or more.

In the following detailed description, for purposes of explanation and not limitation, example embodiments disclosing specific details are set forth in order to provide a thorough understanding of the present teachings. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the example embodiments. Nonetheless, such devices, methods, systems and protocols that are within the purview of one of ordinary skill in the art may be used in accordance with the example embodiments. Finally, wherever practical, like reference numerals refer to like features.

It is noted that in the illustrative embodiments described herein, the network may be a wireless network with a centralized architecture or a decentralized architecture. Illustratively, the network may be one which functions under a DSA Medium Access (MAC) layer, such as to be defined under IEEE 802.22, or as defined under IEEE 802.16, IEEE 802.11, or IEEE 802.15. Moreover, the network may be a cellular network; a wireless local area network (WLAN); a wireless personal area network (WPAN); or a wireless regional area network (WRAN). Furthermore, the MAC protocol may be a time division multiple access (TDMA) protocol; a carrier sense multiple access (CSMA) protocol; a CSMA with collision avoidance (CSMA/CA) protocol; a Code Division Multiple Access (CDMA) protocol; or a frequency division multiple access (FDMA) protocol. It is emphasized that the noted networks and protocols are merely illustrative and that networks and protocols other than those specifically mentioned may be used without departing from the present teachings.

FIG. 1 is a simplified schematic view of a wireless network 100 in accordance with an illustrative embodiment. In a specific embodiment, the wireless network 100 is a centralized network. However, the present teachings may be generalized to a decentralized wireless network.

The wireless network 100 includes an access point (AP) 101, which is also referred to as a base station (BS). The wireless network 100 further comprises a plurality of wireless stations (STAs) 102, which also may be referred to as wireless devices or as Customer Premise Equipment (CPE).

Illustratively, the wireless network 100 may be one of the types of networks noted previously. Moreover, the STAs 102 may be computers, mobile telephones, personal digital assistants (PDA), portable computers, or similar devices that typically operate in such networks. In a specific embodiment, at least one of the STAs 102 is stationary.

As described more fully herein, the STAs 102 and the BS 101 of the example embodiments are adapted to function in restricted frequency channels of a frequency band that requires protection of incumbent users/devices. As such, the BS 101 and the STAs 102 are secondary devices and the network 100 is a secondary network.

It is noted that only a few STAs 102 are shown; this is merely for simplicity of discussion. Clearly, many other STAs 102 may be used. Finally, it is noted that the STAs 102 are not necessarily the same. In fact, a plethora of different types of STAs adapted to function under the chosen protocol may be used within the network 100.

The DSA MAC layer methods and apparati of the example embodiments may be implemented in dynamic environments where the availability and quality of channels vary over time (e.g., new wireless technologies designed for the TV bands). Thus, the network of secondary STAs of the example embodiments beneficially obtain channel availability in a dynamic manner. As described in detail herein, the DSA MAC layer methods and apparati of the illustrative embodiments foster the notification by the secondary STAs 102 to other secondary STAs 102 that an incumbent device(s) has begun occupying licensed channels or frequency bands, or that the occupation is imminent.

Figure 2:
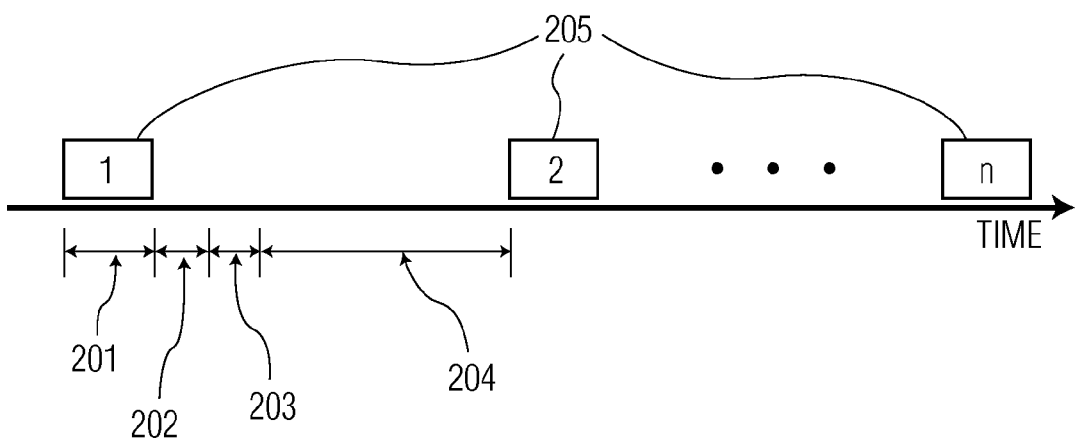
FIG. 2 is a timing diagram of data transmission in accordance with an example embodiment.

FIG. 2 is a timing diagram in accordance with an example embodiment. The description of FIG. 2 is more clearly understood when reviewed concurrently with FIG. 1. In the illustrative infrastructure based centralized wireless system, the MAC layer of the BS 101 functions regulate both downstream (DS) and upstream (US) medium access. Because the system 100 is adapted to function coexistently with incumbent devices in restricted frequency channels, the BS 101 and the STAs 102 of the system 100 continuously or periodically monitor/measure certain parameters. This monitoring/measuring allows detection of the presence of an incumbent device in restricted frequency channels/bands that may be directly affected by the transmission of the BS 101 and STAs 102 belonging to the network 100. According to the example embodiments, the STAs 102 are adapted to notify the BS 101 of its network that an incumbent user has started to operate in a given licensed frequency band.

During a superframe, a plurality (n) of quiet periods 205 each having a duration 201 are provided for measuring the affected channels by the secondary network. Notably, quiet periods are not needed if the measurement is done in channels not directly affected by the wireless network 100. During each quiet period 205, the STAs 102 do not transmit data frames, but rather make measurements and garner data from the affected frequency channels. For example, the data may include received signal strength (RSS) of incumbent devices occupying a channel, the confidence with which a measurement was made, the channel(s) measured, the estimated location of the incumbent user(s), and the measurement duration. These data are processed via algorithms within the physical (PHY) and MAC layers of the STAs 102 for later use.

After the data are garnered and processed, a notification period 202 begins. As described in further detail herein, during the notification period 202, the STAs 102 that have acquired data regarding incumbent devices may provide the information to the BS 101. Based on this information, the BS 101 may take action in later downstream (DS) communications with the STAs 102 that report the information.

After completion of the notification period, an optional recovery period 203 begins. As described in co-pending and concurrently filed application Ser. No. 60/733,504 entitled "Method of Recovering Communication Access After Incumbent Notification in Dynamic Spectrum Access Wireless Systems" to Cordeiro, et al., during the recovery period 202, the BS 101 may issue channel management commands to the STAs 102 ordering the STAs 102 to take a certain action(s). These actions include, but are not limited to: switching channels of operation; terminating operation in a channel(s); and reducing transmit power level. Notably, the recovery period is useful in protecting the service to incumbent devices/users.

After the optional recovery period 202, a communication period 204 begins. The communication period 204 includes US and DS traffic between the STAs 102 and the BS 101 according to the known wireless protocols referenced previously.

Finally, after the completion of the communication period 204, another quiet period 205 (quiet period 2) begins, and the sequence continues until the termination of the current superframe.

Figure 3:
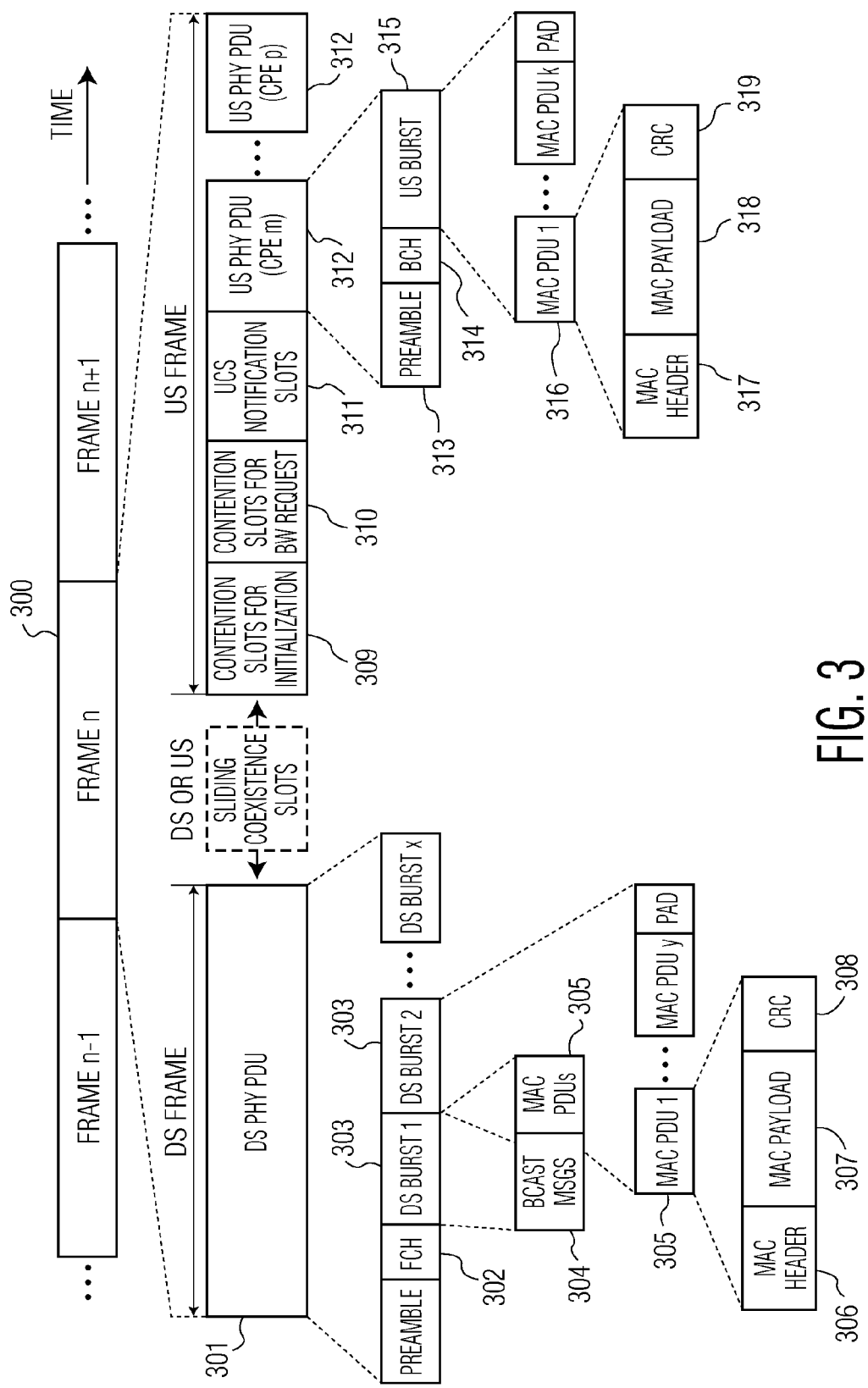
FIG. 3 is a simplified block diagram of downstream (DS) and upstream (US) communication frames in accordance with an example embodiment.

FIG. 3 is a conceptual diagram of a data frame structure that may be used by the MAC layer of the BS 101 to regulate the medium access of the wireless network 100 of the example embodiments. The nth frame 300 comprises two portions: a predominantly downstream (DS) subframe and an upstream (US) subframe. The boundary between these two segments is adaptive, and so the control of the downstream and upstream capacity is easily effected. Beneficially, the method of medium access is thus scalable to accommodate more or fewer STAs 102, and more or fewer STAs 102 providing information to the BS 101 regarding the coexistence of incumbent devices in the wireless network 100. The downstream subframe consists of a downstream PHY protocol data unit (PDU) 301, which is a data packet transmitted over the PHY layer. The PHY PDU 301 may include contention intervals adapted to foster coexistence of the STAs 102 with the incumbent devices.

In addition, the DS PHY PDU 301 may include frame control headers (FCH) 302 and DS bursts 303. The DS bursts 303 may also include broadcast messages 304 and MAC PDUs 305. The MAC PDUs 305 may include MAC headers 306, MAC payload fields 307 and a cyclical redundancy check (CRC) field 308. Notably, because the example embodiments primarily relate to US notification of incumbent users, details of the DS function are omitted in order to avoid obscuring the description of the example embodiments. It is noted that the details of the elements of the DS subframe are known to one skilled in the art and are found in the incorporated specifications.

The US subframe may comprise contention intervals slots 309 for initialization (e.g., initial ranging), contention slots for bandwidth request 310, Urgent Coexistence Situation (UCS) notification slots 311 and one or more upstream PHY PDU 312, each transmitted from different STAs 102. These PHY PDUs 312 are transmitted from different STAs 102 and carry MAC PDUs 305 from the corresponding STA to the BS 101.

The upstream communication of data in the communication frame 204 referenced previously may occur in a variety of ways. For example, the communication of data may be effected via contention based bandwidth allocation. In particular, a known handshaking sequence may be implemented and certain STAs 102 granted bandwidth at particular intervals during the communication frame 204. In an example embodiment, after receiving bandwidth requests via the contention interval slots 309, the BS 101 provides bandwidth allocation for certain STAs 102 in the wireless network. Once the bandwidth is allocated, the STA 102 may occupy the network and transmit upstream data.

For an STA 102 allocated bandwidth during the nth communication frame, the US PHY PDU 312 transmitted by this STA 102 includes a preamble 313, a Burst Control Header (BCH) 314 and a US burst 315. Usefully, the BCH 314 provides information about the STA 102 and its associated BS 101, which is beneficial in tracking users of the spectrum, and hence fosters implementation of policing procedures.

The US burst 315 includes at least one MAC PDU 316, and each MAC PDU 316 includes a MAC header 317, a MAC payload field 318 and a CRC 319. As is known, the bandwidth of a particular communication frame 204 may be limited. As a result, not all STAs 102 of the network may be allocated bandwidth in the nth communication frame. However, if a particular STA 102 is not provided bandwidth in a particular communication frame 204, this particular STA 102 may not be provided the opportunity to notify the BS 101 of a coexistence problem with an incumbent device. Ultimately, this may result the interference of the particular STA 102 with the incumbent device that has begun occupation of the channel. This can be a violation of the regulatory provisions regarding the coexistence of incumbent devices and secondary devices.

In accordance with example embodiments, methods of notifying the BS 101 of the existence of incumbent devices by STAs 102 are provided. In a specific embodiment, a notification method is provided for STAs 102 that have been allocated bandwidth during a particular communication frame 204, regardless of whether or not sufficient for all data transmission from the STA. In another specific embodiment a notification method is provided for those STAs 102 that have not been allocated bandwidth in the particular communication frame.

Figure 4:
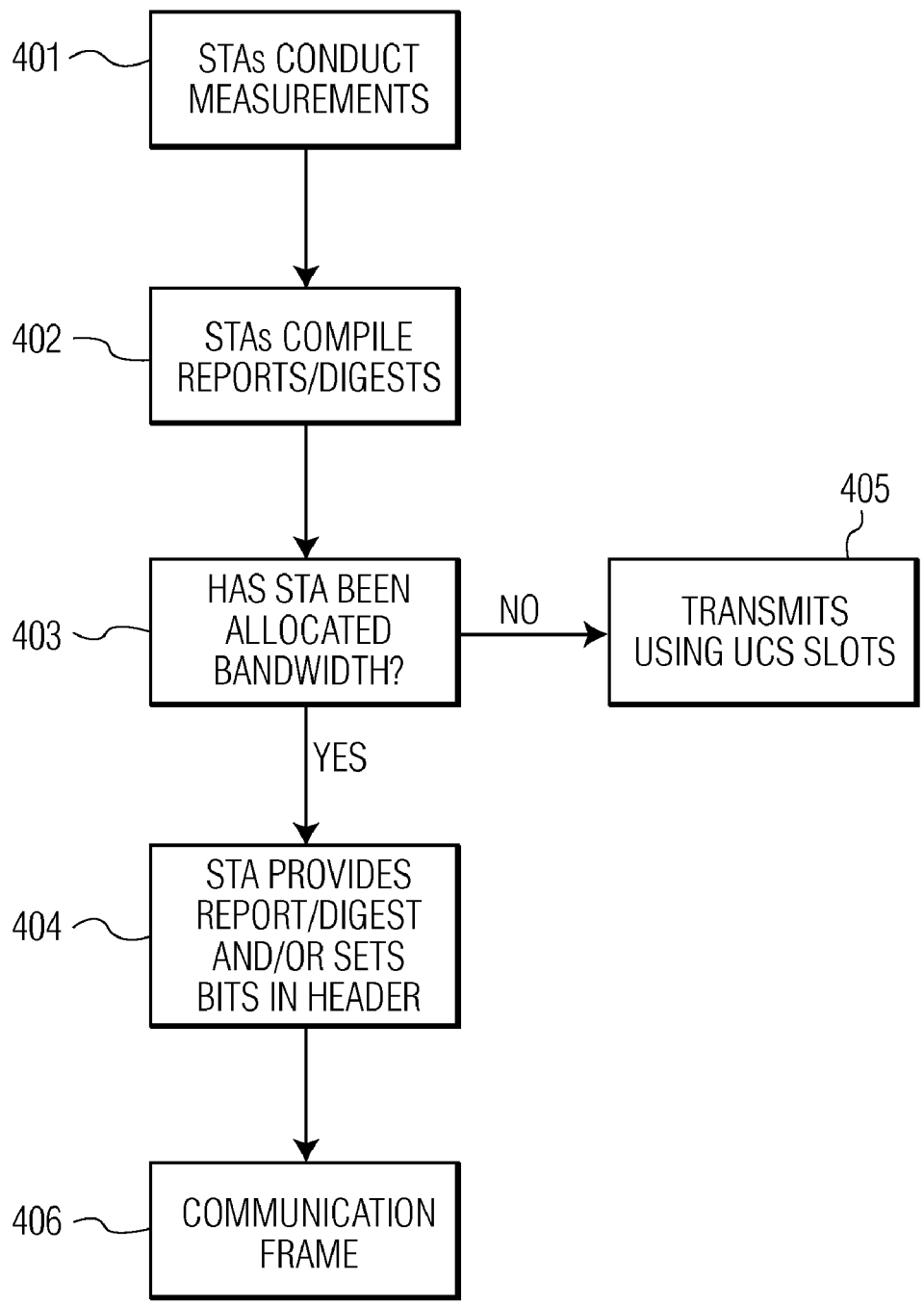
FIG. 4 is a simplified flow-chart of a method of wireless communication in accordance with an example embodiment.

FIG. 4 is a method of notifying the BS 101 of coexistence of incumbent devices with the STAs 102 of the wireless network 100 in accordance with an example embodiment. It is useful to review the method in conjunction with FIGS. 1-3.

At step 401, the STAs 102 of the wireless network 100 conduct measurements. Normally, the measurements are conducted at the direction of the BS 101. To wit, the BS 101 may provide instructions in the beacon at the beginning of the superframe broadcast to the STAs 102 to conduct measurements. The measurements may be made in-band during a quiet period or out-of-band during the communication period. The measurements include, but are not limited to measurements of received signal strength of any incumbent device occupying a restricted channel or band.

At step 402, the STAs 102 compile reports, or digests, or both, based on the measurements garnered during step 401. As noted previously, the PHY layer of the STAs includes algorithms directed at the compilation of the reports/digests.

Table 1 shows an example of a report, which can be sent from the STAs 102 to the BS 101, and which reports on the presence or absence of an incumbent(s). Other types of reports may also be defined based on data garnered in the measurements. Table 2 illustrates types of devices that are detected and Table 3 illustrates a report mode.

TABLE 1

| Message Format | | |
|---|---|---|
| Syntax | Size | Notes |
| Signal_Specific_Measurement_Report_Format | | |
| System Profile | 8 bits | See Table 2 |
| Report Mode | 4 bits | Table 3 |
| Start Frame | 8 bits | Frame number in which the channel measurement started |
| Duration | 16 bits | The duration of the measurement |
| Channel Number | 8 bits | |
| Value | 10 bits | The value (e.g., output SINR) of the measurement |
| Precision | 6 bits | Indicates the accuracy (significance) of the measured value |
| } | | |

TABLE 2

| System Profiles | |
|---|---|
| System_Profile | Description |
| 0 | 802.22 |
| 1 | ATSC |
| 2 | NTSC |
| 3 | Wireless Microphone |
| 4 | DVB |
| 5-255 | Reserved |

TABLE 3

Report Mode

| Syntax | Size | Notes |
| --- | --- | --- |
| Report_Mode_Format | | |
| Late | 1 bit | Indicates whether this STA is unable to carry out a measurement request because it received the request after the requested measurement time. The Late bit shall be set equal to 1 to indicate the request was too late. The Late bit shall be set to 0 to indicate the request was received in time for the measurement to be executed, or if no start time was specified. |
| Incapable | 1 bit | Indicates whether this STA is incapable of generating this report requested by the BS. The Incapable bit shall be set to 1 to indicate the STA is incapable. The Incapable bit shall be set to 0 to indicate the STA is capable or the report is autonomous. |

Next, in the illustrative method, shown as decision 403, the bandwidth allocation garnered in the frame directs the actions of the STAs 102. To this end, as noted previously the BS 101 may not be able to allocate bandwidth to all STAs within the network. Moreover, even though a STA 102 has been provided bandwidth during a (US) communication frame 204, the STA 102 may not be provided sufficient bandwidth to transmit all data to the BS 101. If the STA 102 is provided sufficient bandwidth to provide data to the BS 101, or even if the STA 102 is provided with insufficient bandwidth to transmit all data in the current communication frame 204, the method continues at step 404. If, however, the STA 102 has not been allocated bandwidth during the communication frame 204, the method continues at step 405.

In certain instances, an STA 102 may be allocated sufficient (US) bandwidth allocation to transmit a complete report regarding the incumbent device operating in a particular frequency band back to the BS 101. According to a specific embodiment, at step 406, the STA 102 effects this US transmission during its allocated time in the communication frame 204. Notably, the transmission of the report takes precedent over the transmission of other data by the STA 102. Thus, the report is transmitted first and may be followed by the transmission of other data communications in the US burst 315.

Illustratively, a full report transmitted in frame 204 from the STA 102 to the BS 101 may include information such as:
- Frequency channel/band where the primary radio system has occupied. If past historic information is available about channel occupation, the STA 102 may also inform about future channel occupations by an incumbent user or a primary radio system;
- The received power at which the primary radio signal is detected;
- The reliability of the detection;
- If known, the type of primary radio system that has been detected;

Once the BS 101 receives the report from the STA 102, the BS 101 may take one or more of a variety of actions to reduce the likelihood that a secondary STA 102 interferes with the function of an incumbent device/service in a particular channel or band. These actions, which can be taken at anytime starting in the next proceeding DS subframe, include, but are not limited to directing the STAs 102 to switch to a rendezvous channel and/or ceasing operation in the particular channel/band until another channel/band for operation may be selected by the BS 101.

In the event that an STA 102 is allocated sufficient US bandwidth but did not respond back to the BS 101, the BS 101 may act on the assumption that the lack of response from the STA 102 was due to interference from the incumbent device. To this end, the interference generated by the incumbent service/device may cause collisions with the signals originated at the BS 101. In this case, the BS 101 may take actions directed to channel management to overcome the UCS. For example, the BS 101 may transmit a command in the DS subframe that all STAs 102 move to a rendezvous channel or backup channel.

In other instances, the STA 102 may not have sufficient bandwidth to provide a full report such as shown in Table 1, and may transmit a digest of the report instead. The digest would comprise of only salient aspects of the full report. For example, the digest could simply notify about the presence/absence of the incumbent, which channel, and the incumbent's received signal strength.

There are various reasons why an STA allocated bandwidth in a particular (e.g. nth) communication frame may not have sufficient bandwidth to provide a full report or a digest. One reason is scarcity of bandwidth and the rationing of bandwidth by the BS 101 to those STAs 102 granted bandwidth. In addition, the STA 102 may need to transmit sensitive traffic (e.g., voice transmissions) in order to meet quality of service (QoS) guarantees, which may preclude the STA 102 from sending the report to the BS. As can be appreciated, this may limit the bandwidth available for transmission of the report or digest. In this case, the method of the example embodiments provides for the efficient notification of the existence (or imminent existence) of an incumbent device in a restricted channel/band.

The method of efficiently providing information regarding the existence of incumbent devices includes providing bits in the MAC header 317 indicative of the presence of the incumbent devices. Beneficially, this may be carried out by secondary STAs 102 that are not allocated bandwidth in a particular communication frame 204 and by those that are allocated insufficient bandwidth in the frame 204.

Secondary STAs 102 that are granted US bandwidth by the base station, but may not have sufficient bandwidth to transmit a full report or a digest may nonetheless transmit sufficient information to the BS 101 to properly notify the BS 101 of the existence of an incumbent device. In an example embodiment at step 404, the STA 102 provides the MAC header 317 to the BS 101 including a UCS data field and a CN data field. Beneficially, the MAC protocol of the example embodiments provides a UCS data field and a CN data field in the main protocol MAC header. These fields fosters quick and efficient notification to the BS 101 about the operation (or imminent operation) of an incumbent device in a primary channel/band. Notably, even if an STA 102 has the requisite bandwidth to provide a full report, the STA 102 may also include the noted fields in the MAC header.

Table 4 depicts an example of a MAC header that contains the UCS and CN fields. Since these fields are part of the MAC header itself, even though not enough (if any) bandwidth has been allocated to the STA 102 for a full report or a digest, the STA 102 can still notify the BS 101 of the existence of an incumbent device with minimal information. In this case, the STA 102 would simply set the UCS and CN fields informing the BS 101 of the incumbent device and the affected channel. Optionally, the MAC header may also accommodate a received signal strength (RSS) data field. The RSS data field is set by the STA 102 and provides a received signal level value of the incumbent device in the restricted channel/band.

As such, via a relatively small amount of overhead, the STA 102 provides an indication to the BS 101 of the received signal strength from the incumbent service at the STA location.

Given that only a limited amount of US bandwidth is available for allocation by the BS, only a few STAs 102 are granted permission to transmit a given frame. Nonetheless, information regarding the presence of an incumbent device must be provided to ensure incumbent protection. In an example embodiment, secondary STAs 102 that are not granted US bandwidth during the DS subframe by the BS 101 contend for UCS notification slots 311 for transmission of UCS, CN and, optionally, RSS data in the MAC header to the BS 101. After garnering a slot 311, at step 405, the STA 102 transmits a MAC header with the noted fields. Upon receiving notification of the coexistence of an incumbent device in the data fields of the MAC header, the BS 101 may take action to avoid interfering with primary channel communication.

Because only a limited number of UCS slots are provided in each US subframe, the UCS slot 311 may also be unavailable to an affected STA 102 in a particular frame. In an example embodiment, the affected STA 102 then awaits a subsequent frame where the BS will either allocate upstream bandwidth for this particular STA 102 or allocate a UCS notification slot 311 to the STA 102. The access to these UCS notification slots 311 may be contention-based and implemented with a known truncated exponential binary backoff algorithm. Beneficially, in order to reduce the number of collisions in the UCS notification slots 311, in an example embodiment, the only situation in which an STA 102 is allowed to use these contention-based UCS slots 311 is when the particular STA 102 has not been allocated US bandwidth.

In an embodiment, once the BS 101 receives the MAC header from an STA 102 including UCS notification (e.g., in the nth frame), the BS 101 may allocate more US resources in the next frame (frame n+1) to the reporting STA 102 so that this STA 102 can send a full report back to the BS 101. Alternatively, the BS 101 may issue a channel management command in the next frame for all STAs 102 to cease operation in the affected channel/band, and/or switch operation to a rendezvous channel. In another embodiment, the BS 101 could delay taking any immediate action and wait for reports or header information from other STAs 102. In case no other STAs 102 report the same UCS, the BS 101 may conclude that the UCS provided by a single STA is not reliable and may disregard the UCS. On the other hand, if multiple STAs report the same coexistence situation in the same CN, then the BS 102 shall take action such as described above in order to resolve the issue. In yet another embodiment, the BS 101 may use transmission power control techniques in order to address the UCS.

TABLE 4

| Syntax | Size | Notes |
|---|---|---|
| MAC_Header_Format( ) { | | |
| HT = 0 | 1 bit | Header type. |
| EC | 1 bits | Encryption control |
| | | 0 = payload is not encrypted |
| | | 1 = payload is encrypted |
| Type | 6 bits | Indicates the subheaders and special payload types present in the message payload |
| Reserved | 2 bits | Reserved |
| EKS | 2 bits | Encryption key sequence |
| | | The index of the traffic encryption key (TEK) and initialization vector used to encrypt the payload. This field is only meaningful if the EC field is set to 1 |
| UCS | 1 bit | Urgent Coexistence Situation |
| | | Used by the STA to indicate the BS about an urgent coexistence situation with incumbents in the channel(s) currently being used by the BS. |
| | | 0 = no incumbent (default) |
| | | 1 = incumbent detected |
| CN | 8 bits | Channel Number |
| | | It indicates exactly which of the channel(s) is under an urgent coexistence situation with incumbents (UCS == 1) or is vacant (UCS == 0). |
| Length | 11 bits | The length in bytes of the MAC PDU |
| CID | 16 bits | Connection identifier |
| HCS | 8 bits | Header check sequence |
| | | The transmitter shall calculate the HCS value for the first six bytes of the header, and insert the result into the HCS field (the last byte of the MAC header). It shall be the remainder of the division (Modulo 2) by the generator polynomial $g(D) = D^8 + D^2 + D + 1$ of the polynomial $D^8$ multiplied by the content of the header excluding the HCS field. (Example: [HT EC Type] = 0x80, BR = 0xAAAA, CID = 0x0F0F; HCS should then be set to 0xD5). |

The methods of notification of the presence of incumbent devices in channels/bands described in the example embodiments attempt to balance reliability of notification with data efficiency. To this end, according to an embodiment, BS 101 may allocate US bandwidth to each STA 102 in the network so that each STA 102 may report the presence of an incumbent device after measurements are taken. Thus, if after each quiet period 205, each STA 102 were allocated bandwidth sufficient to ensure proper notification, the coexistence problems created by the use of restricted channels by secondary STAs 102 may be reliably addressed. In this case, the BS does not need to allocate time for the UCS notification slots. In some situations, however, this may lead waste of bandwidth especially when no incumbents were detected. There is, therefore, a clear trade-off between notification reliability and data efficiency. Beneficially, the example embodiments offer various options aimed at providing reliability concurrently with data efficiency.

In view of this disclosure it is noted that the various methods and devices described herein can be implemented in hardware and software. Further, the various methods and parameters are included by way of example only and not in any limiting sense. In view of this disclosure, those skilled in the art can implement the present teachings in determining their own techniques and needed equipment to effect these techniques, while remaining within the scope of the appended claims.

The invention claimed is:

1. In a wireless communication network, a method of wireless communication, comprising:
   transmitting a medium access control (MAC) header from a secondary wireless device to another secondary wireless device when bandwidth to the secondary wireless device in an upstream subframe either is not allocated to the secondary wireless device or is allocated to the secondary wireless device and is insufficient for full data transmission, wherein the MAC header includes a field that indicates the operation or absence of operation of an incumbent device in a restricted frequency channel.

2. A method as recited in claim 1, wherein the field is an urgent coexistent situation (UCS) data field indicating the operation of the incumbent device.

3. A method as recited in claim 1, wherein the MAC header further comprises a channel number (CN) data field indicating the frequency channel.

4. A method as recited in claim 1, wherein the another wireless device is a base station.

5. A method as recited in claim 1, further comprising:
   transmitting a report from the secondary wireless device to the another secondary wireless device, wherein the report includes measurement information of the restricted frequency channel.

6. A method as recited in claim 5, further comprising:
   allocating bandwidth to the secondary wireless device at a specified time; and
   transmitting the report during the specified time.

7. A method as recited in claim 5, further comprising:
   providing an urgent coexistent situation (UCS) notification slot, wherein the report is not transmitted during the UCS notification slot.

8. A method as recited in claim 7, further comprising transmitting a UCS data field in the UCS notification slot from the secondary wireless device only if the secondary wireless device is not allocated upstream bandwidth in an upstream subframe.

9. A method as recited in claim 1, further comprising:
   providing an urgent coexistent situation (UCS) notification slot during which the MAC header is received by the another secondary wireless device.

10. In a wireless communication network, a method of wireless communication, comprising:
    allocating upstream (US) bandwidth to a first secondary wireless device;
    not allocating upstream bandwidth to a second secondary wireless device;
    transmitting from the first secondary wireless device to a base station a report including measurement information of a restricted frequency channel; and
    transmitting from the second secondary wireless device to the base station a medium access control (MAC) header including a field that indicates the operation of an incumbent device in the restricted frequency channel or another restricted frequency channel.

11. A method as recited in claim 10, wherein the field is an urgent coexistent situation (UCS) data field indicating the operation of the incumbent device.

12. A method as recited in claim 11, wherein the restricted frequency channel is a licensed or an unlicensed frequency channel.

13. A method as recited in claim 11, further comprising providing an urgent coexistent situation (UCS) notification slot during which the MAC header is received by the base station.

14. A method as recited in claim 13, wherein the report is not transmitted during the UCS notification slot.

15. A method as recited in claim 10, wherein the MAC header further comprises a channel number (CN) data field indicating the restricted frequency channel.

16. A method as recited in claim 10, further comprising, after the transmitting the MAC header, allocating bandwidth at a specified time in a subsequent data frame to the second secondary wireless device.

17. A method as recited in claim 16, further comprising transmitting another report from the second secondary wireless device to the base station in the specified time.

* * * * *